(12) United States Patent
Tocchini et al.

(10) Patent No.: US 8,898,562 B2
(45) Date of Patent: Nov. 25, 2014

(54) SYSTEM AND METHOD FOR HARMONIOUS TILING SEARCH AND PUBLISHING

(76) Inventors: Dan Tocchini, San Francisco, CA (US);
Javier Vega, San Francisco, CA (US);
Brian Axe, Portola Valley, CA (US)

( * ) Notice: Subject to any disclaimer, the term of this patent is extended or adjusted under 35 U.S.C. 154(b) by 195 days.

(21) Appl. No.: 13/412,331

(22) Filed: Mar. 5, 2012

(65) Prior Publication Data

US 2012/0226971 A1  Sep. 6, 2012

Related U.S. Application Data

(60) Provisional application No. 61/449,462, filed on Mar. 4, 2011.

(51) Int. Cl.
*G06F 17/00* (2006.01)
*G06F 17/30* (2006.01)

(52) U.S. Cl.
CPC .................. *G06F 17/30905* (2013.01)
USPC ......................................................... 715/247

(58) Field of Classification Search
USPC ......... 715/224, 225, 227, 228, 243, 244, 245, 715/246, 247
See application file for complete search history.

(56) References Cited

U.S. PATENT DOCUMENTS

| | | | | |
|---|---|---|---|---|
| 5,381,523 A * | 1/1995 | Hayashi | ........................ | 715/204 |
| 5,459,826 A * | 10/1995 | Archibald | ..................... | 715/209 |
| 5,499,366 A * | 3/1996 | Rosenberg et al. | ................... | 1/1 |
| 5,553,217 A * | 9/1996 | Hart et al. | ..................... | 715/210 |
| 5,619,636 A * | 4/1997 | Sweat et al. | ................... | 715/202 |
| 5,831,612 A * | 11/1998 | Stoval et al. | .................. | 715/792 |
| 5,929,854 A * | 7/1999 | Ross | ............................. | 715/783 |
| 6,031,989 A * | 2/2000 | Cordell | ........................ | 717/109 |
| 6,704,024 B2 * | 3/2004 | Robotham et al. | ............ | 345/581 |
| 6,801,229 B1 * | 10/2004 | Tinkler | ......................... | 715/853 |
| 2004/0177327 A1* | 9/2004 | Kieffer | ......................... | 715/901 |
| 2007/0143750 A1* | 6/2007 | Varela et al. | ................... | 717/174 |
| 2008/0022197 A1* | 1/2008 | Bargeron et al. | ............. | 715/246 |
| 2008/0091656 A1* | 4/2008 | Charnock et al. | ................. | 707/3 |
| 2008/0195645 A1* | 8/2008 | Lapstun et al. | ............... | 707/102 |
| 2011/0016431 A1* | 1/2011 | Grosz et al. | ................... | 715/841 |
| 2011/0167353 A1* | 7/2011 | Grosz et al. | ................... | 715/738 |
| 2011/0214050 A1* | 9/2011 | Stambaugh | ................... | 715/234 |
| 2011/0231790 A1* | 9/2011 | Forstall et al. | ................. | 715/779 |
| 2012/0042240 A1* | 2/2012 | Oliveira et al. | ............... | 715/243 |
| 2012/0143931 A1* | 6/2012 | Rosenberger et al. | ......... | 707/828 |
| 2012/0154444 A1* | 6/2012 | Fernandez | ..................... | 345/655 |
| 2012/0232939 A1* | 9/2012 | Pierre et al. | ........................ | 705/4 |
| 2013/0311910 A1* | 11/2013 | Stambaugh | ................... | 715/760 |
| 2013/0326384 A1* | 12/2013 | Moore et al. | .................. | 715/771 |

* cited by examiner

*Primary Examiner* — Laurie Ries

(57) ABSTRACT

A new approach is proposed that contemplates systems and methods to provide harmonious tiling layout for a single heterogeneous data feed with a unique and brief syntax. The approach provides solutions to fit shapes into a container without having any holes by automatically providing the most optimum harmonious layout and tile presentation "win-out" over time, and a survival of the fittest of visual presentation based on configurable metrics. A single user interface combines the action of searching and publishing as a single process whereby search results are formatted with the intention to facilitate publishing the chosen items.

36 Claims, 13 Drawing Sheets

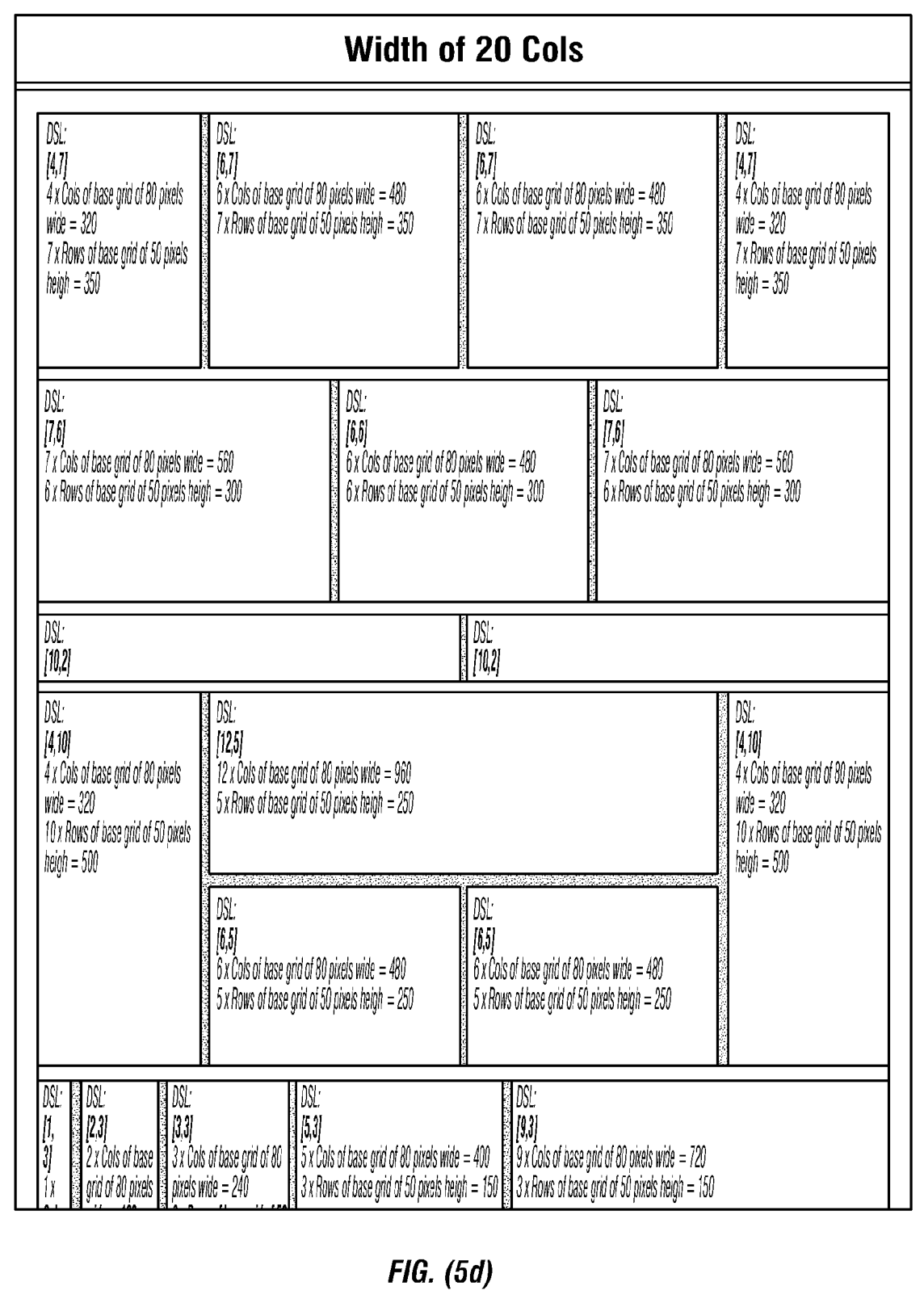

FIG. (5d)

SYSTEM AND METHOD FOR HARMONIOUS TILING SEARCH AND PUBLISHING

RELATED APPLICATIONS

This application claims the benefit of U.S. Provisional Patent Application No. 61/449,462, filed Mar. 4, 2011, which application is hereby incorporated herein by reference.

BACKGROUND

1. Field of the Invention

The present invention is directed generally to a system for consuming and publishing electronic media. The system may be used for consuming and publishing electronic media on web pages displayed by web browsers on computers, phones, touch-pads, etc. The present invention may also be used for generating layouts for traditional print publishing in books, magazines, newspapers, etc.

2. Description of the Related Art

Traditional publishing systems require graphic artists, editors and revenue officers to agree on how to layout content for publishing. For example, an editor decides which article might be the most popular article, a graphic artist figures out how best to fit the headlines, pictures, and text for various articles on a page and a revenue officer will decide how much space to allocate to advertisements. The process relies on the expertise of the people involved to layout the ads and content.

Social media systems like twitter and Facebook allow users to consumer media in their activity stream (a list of articles, comments, photos, etc shared from people they follow). The media they consume can easily be shared with others by using the re-share functionality of these social network systems.

Search engines allow one to type in a query and display results from a database related to the query. These search engine database is a copy of all data published on the web and typically includes just a sample of and a link to the media available from the website.

Browsers allow one to open multiple windows displayed in a tab format for easy navigation from one web page to another. Sometimes the web pages are dynamically updated so real-time updates are available upon clicking on a tab, but in most cases, the web pages are not dynamically updated and require a user action to refresh the page.

There is a need for harmonious tiling systems and methods that design interfaces or present content in a dynamic manner. Currently, when laying out interface elements on a screen, or text and images in print, or articles on a blog, etc., each element is positioned within a container of fixed size. The layouts tend to be one of two generally fixed natures:

Automatically fixed in a structure of minimal complexity, like a vertical list, or 3D 'carousel', etc. Likewise, data feeds of such structures tend to be homogenous in that they tend to have elements of the same type, i.e., articles in a blog, images in a gallery, results from a search.

Manually fixed in arbitrary structures, ie. a website where each element is manually fixed to a precise position and size. Likewise, such layouts do not generally have a overarching data structure for the elements in the layout.

The foregoing examples of the related art and limitations related therewith are intended to be illustrative and not exclusive. Other limitations of the related art will become apparent upon a reading of the specification and a study of the drawings.

SUMMARY OF THE INVENTION

Accordingly, an object of the present invention is to provide systems and methods that reduce the amount of time designing interfaces or presenting content is spent in implementing a fixed layout.

Another object of the present invention is to provide systems and methods that efficiently fit different size tiles into a fixed or fluid size container.

A further object of the present invention is to provide systems and methods that automatically produce variations in layout and the size and presentation of the tiles to produce a "harmonious" and fresh visual experience, one without gaping holes in the tiled structure of content and where one data feed can be rendered in many ways.

Another object of the present invention is to provide systems and methods that automatically provide the most optimum layout and tile presentation "win-out" over time, and a survival of the fittest of visual presentation based on configurable metrics.

A further object of the present invention is to provide systems and methods that remove the hard-work of manually laying information out on a screen put the focus on inputting quality data while trusting that it will be presented in a manner that will maximize configurable goals.

Yet another object of the present invention is to provide systems and methods that allow all types of content, including but not limited to, video, text, audio, images, ads, products, and the like, to be rendered in a magazine like manner with the ability to make itself appear novel by calculated changes in visual presentation.

Still another object of the present invention is to provide systems and methods that define a clear API for creating and using different types of tiles and to give them a set of rules on how to respond to the layout.

Another object of the present invention is to provide systems and methods that enable fixing the relative position/order of tiles or particular harmonies.

Still another object of the present invention is to enable the automatically generated layout to respond to the medium in which it is being rendered.

Another object of the present invention is to provide systems and methods that enable the Harmonious Tiling Layout to be applied to any arbitrary, well-formed, HTML file.

A further object of the present invention is to provide systems and methods that enable using the system to replace CSS (Cascading Style Sheets) based layouts in HTML browsers by enabling web developers to configure a Harmonious Tiling Layout in the metadata of HTML elements without comprising the semantic structure. By combining different types of Harmonies, any structured layout can be implemented, thus the present invention can be used instead of structuring HTML elements with CSS.

Another object of the present invention is to provide systems and methods that enable animated, asynchronous interaction with the harmonies and the tiles.

A further object of the present invention is to provide systems and methods that produce ads, products, promotions and other monetized pieces of content an equal footing in visual real estate as the rest of content, including but not limited to, potentially supplement a data feed with ads and render it such that the it is not apparent what is the ad and the normal content, and to auto-optimize the position of the ad and its visual properties.

A further object of the invention is to allow users to trade or purchase tile space in order to promote their businesses.

Another object of the present invention is to provide systems and methods that allow a rich set of functionality for manipulating the data, without compromising the layout algorithm, such as ordering the tiles by most comments or most social signals, are done on the client in runtime and fed back into the algorithm, or filtering to just show items with a particular tag.

Yet another object of the present invention is to enable multiple content contributors to publish tiles to a single website.

Another object of the invention is the use and creation of a single user interface to combine the action of searching and publishing as a single process whereby search results are formatted with the intention to facilitate publishing the chosen items.

Another object of the present invention is to create a dashboard displaying media related to a user's interests. The related media may be implicitly determined by extracting concepts or keywords from the user's websites, blogs, social media posts, posts of people followed, posts re-shared, posts liked, etc or explicitly by capturing keywords directly from the user.

BRIEF DESCRIPTION OF THE DRAWINGS

FIGS. 5(a)-(d) depict examples of harmonious layouts with various number of columns.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to provide harmonious tiling layout for a single heterogeneous data feed with a unique and brief syntax. The approach addresses a 'polygonal packing problem', or 'how do you fit one set of shapes into a large container of a particular size and shape in the most optimal manner,' and provides solutions to fit shapes into a container without having any holes. Specifically, the approach automatically provides the most optimum/harmonious layout and tile presentation "win-out" over time, and a survival of the fittest of visual presentation based on configurable metrics. Example signals for ranking or sorting the display of content include: views of content tiles, mouse-over of content tiles, clicks of content tiles, views and time spent viewing expanded content from a tile; mouse-over views, clicks and time spend viewing related content contained in the expanded content from a tile; likes and comments of content tiles or expanded content from a tile either on said website or other websites where tile content may be published; the aforementioned interactions on the content displayed on the search dashboard portion of the single interface search and publishing system described below.

Figure 3A:
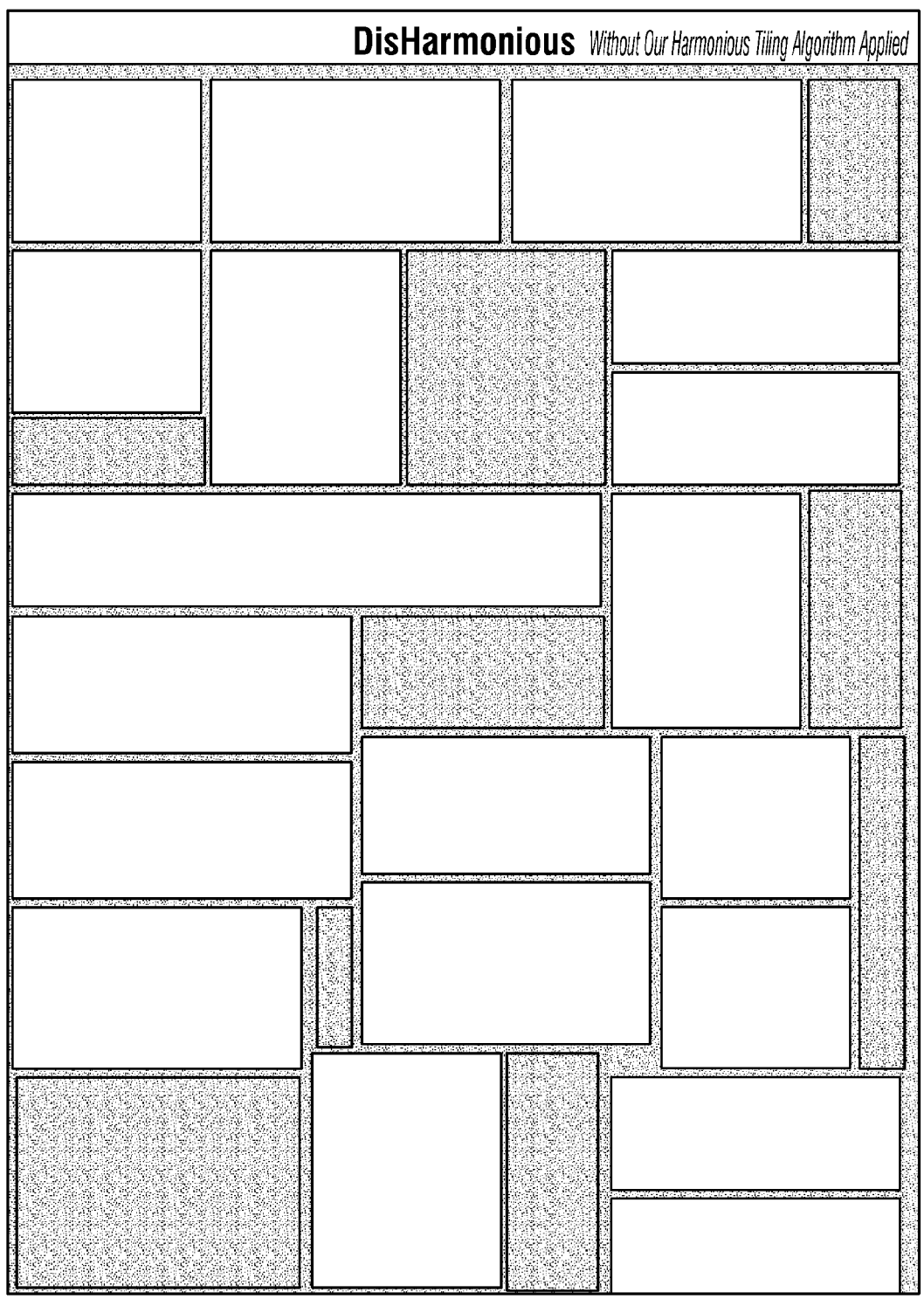
FIG. 3(a) depicts an example of a non-optimal layout of tiles with holes in the layout.
Figure 3B:
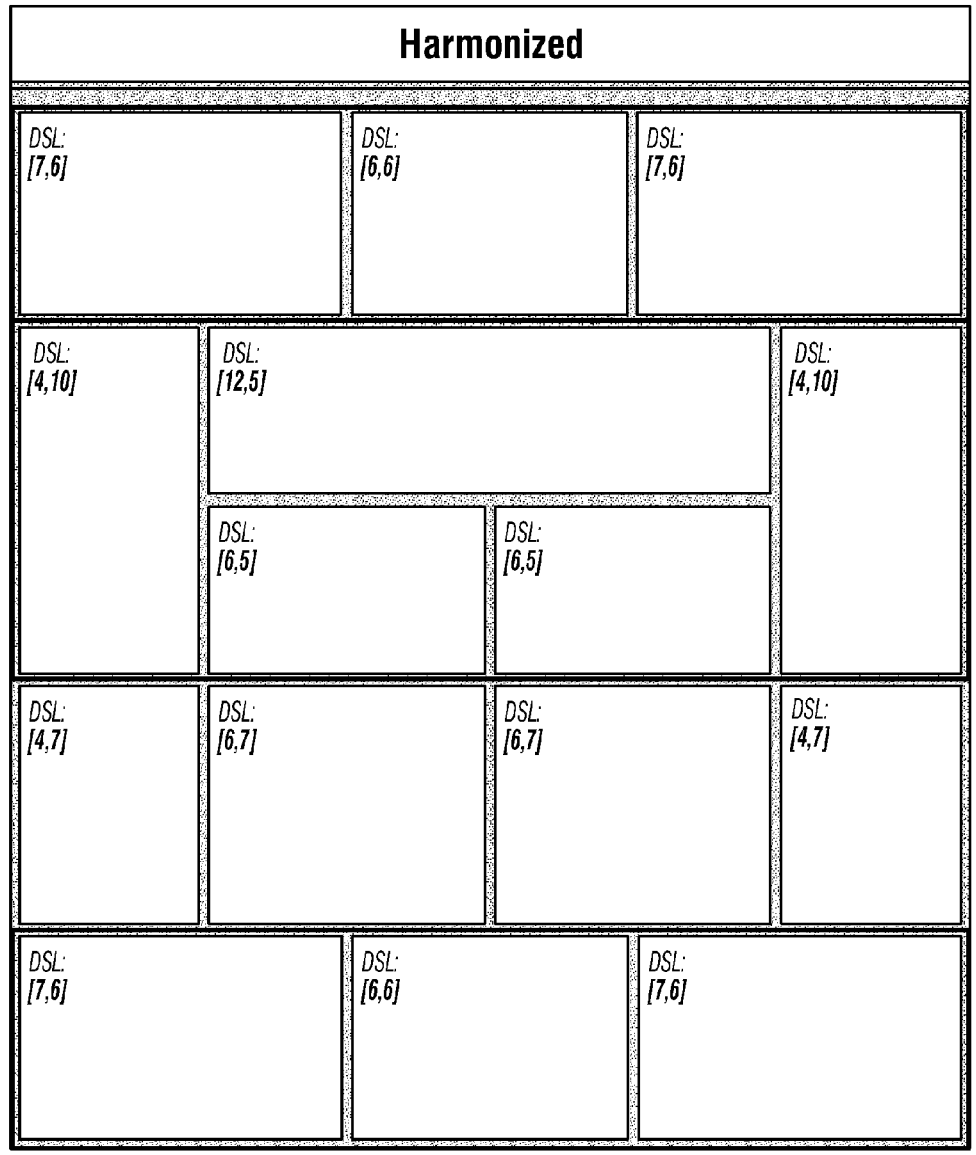
FIG. 3(b) depicts an example of a harmonized version of the same layout with the same sizes of tiles with all the holes in FIG. 3(a) removed.

FIG. 3(a) depicts an example of a non-optimal layout of tiles with holes in the layout, which is herein referred to as a 'DisHarmonious' layout. FIG. 3(b) depicts an example of a harmonized version of the same layout with the same sizes of Tiles with all the holes in FIG. 3(a) eliminated, which is herein referred to as a 'Harmonious' layout Definition of Terms As used hereinafter, all visual pieces of content in the algorithm are treated as polygonal "tiles". A tile may be a video, an ad, an image, or any piece of content.

As used hereinafter, groups of tiles that produce a hole-free segment of visual real estate on the screen are defined as "Harmonies" for harmonious tiling layout. Harmonies determine the relative position and size for a subset of tiles. So, the simplest of harmonies is a single large rectangle that fills the screen. Another one is three equal sized rectangles that divide their horizontal space by three. Likewise, much more complex harmonies can be produced that contain many sizes of tiles. Multiple such harmonies can be stacked together to produce nearly all ordered variations of visual layout in web and print.

As used hereinafter, a global search is defined as a search box or option in which a search is performed and the data results come from a global search engine external to the publishing platform, and the organization of the data results is suggested but doesn't have to be displayed in any specific order or format by a search engine such as Google, Yahoo or Bing; or from a featured media provider such as YouTube, Vimeo or Flickr.

Figure 1:
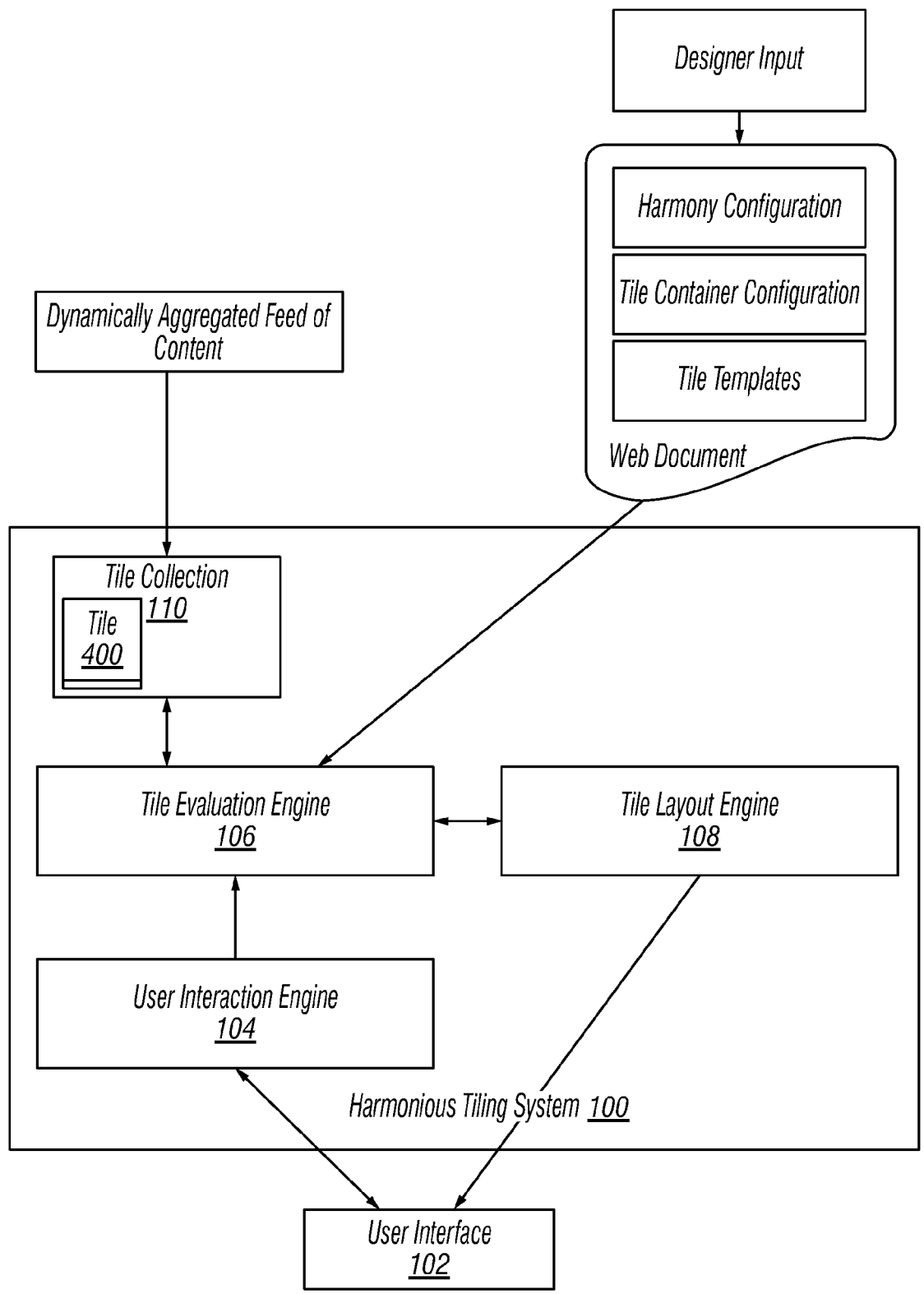
FIG. 1 depicts an example of a diagram of a harmonious tiling system to support harmonious tiling layout at runtime.

FIG. 1 depicts an example of a diagram of a harmonious tiling system 100 to support harmonious tiling layout at runtime. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least user interface 102, user interaction engine 104, tile evaluation engine 106, tile layout engine 108, and tile collection 110. As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 1, each of the engines can run on one or more hosting devices (hosts). Here, a host can be a computing device, a communication device, a storage device, or any electronic device capable of running a software component. For non-limiting examples, a computing device can be but is not limited to a laptop PC, a desktop PC, a tablet PC, an iPod, an iPhone, an iPad, Google's Android device, a PDA, or a server machine. A storage device can be but is not limited to a hard disk drive, a flash memory drive, or any portable storage device. A communication device can be but is not limited to a mobile phone.

In the example of FIG. 1, the engines each has a communication interface (not shown), which is a software component that enables the engines to communicate with each other following certain communication protocols, such as TCP/IP protocol, over one or more communication networks (not shown). Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

When the system depicted in FIG. 1 is in operation, tile evaluation engine 106 accepts a tile collection 110 having a plurality of tiles from dynamically aggregated feed of content. In addition, tile evaluation engine 106 also accepts and adjusts a plurality of tile templates and harmony configurations received from designer input in the form of a web document. Once the tile evaluation engine 106 provides the plurality of tiles and their adjusted configurations to tile layout engine 108, tile layout engine 108 calculates the structural layout data for the plurality of tiles and detects if any of the tiles in the tile collection need to be processed with one of the tile templates. Tile layout engine 108 then provides the structural layout data back to tile evaluation engine 106 for evaluation to ensure that the structural layout is harmonious and tile metadata is reflected in structural decisions. Once evaluated, tile layout engine 108 adjusts and applies the structural layout data on the plurality of tiles to create a harmonious layout of the plurality of tiles. The harmonious layout of the plurality of tiles is then rendered by tile layout engine 108 on user interface 102 for presentation to the user. In the event that, for a non-limiting example, the display area and/or properties of the user interface 102 have changed and a new layout is needed, user interaction engine 104 notifies tile layout engine 108 to fetch more tiles from tile collection 110 and to provide any metadata to tile layout engine 108.

Figure 2:
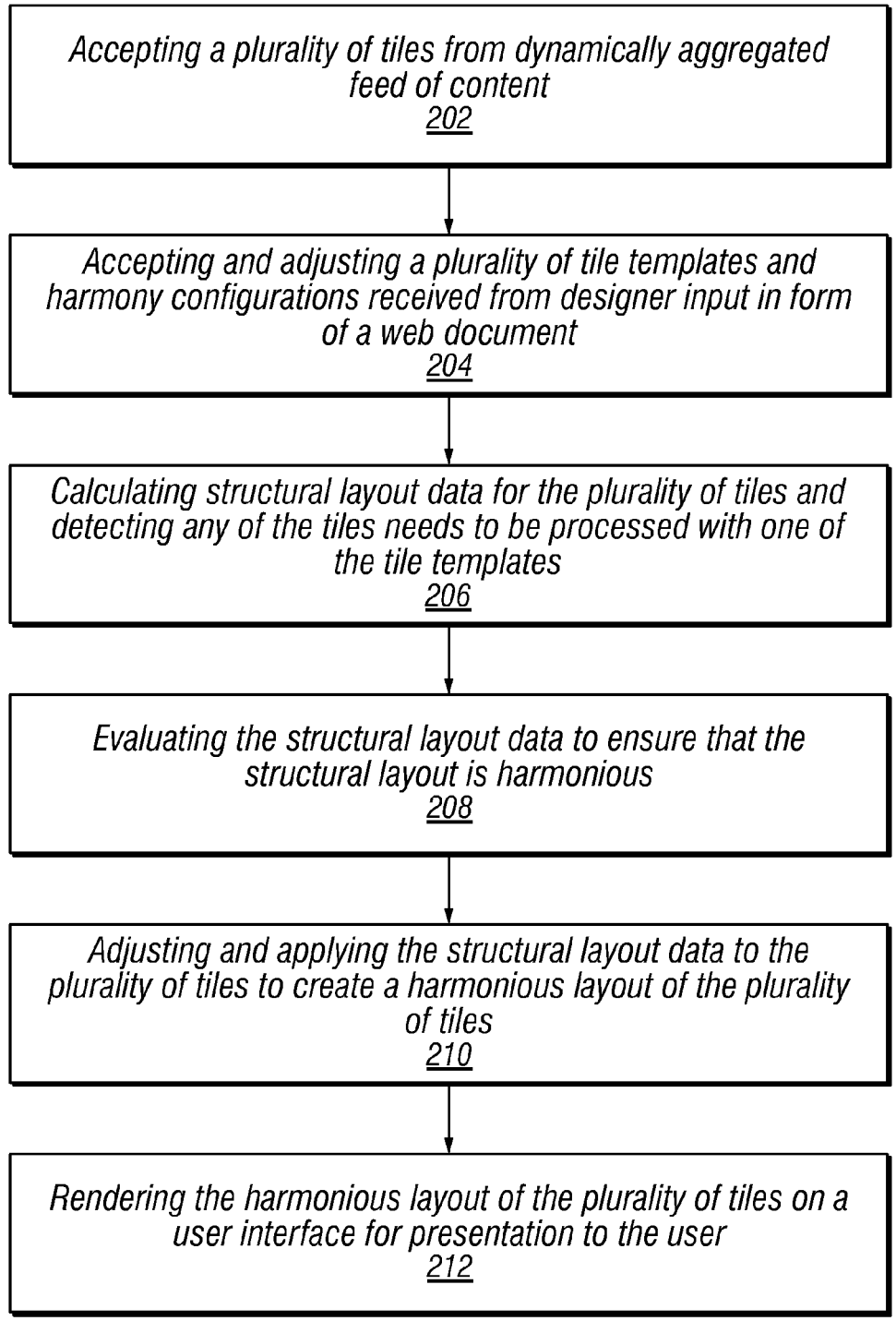
FIG. 2 depicts an example of a flowchart to support harmonious tiling layout at runtime.

FIG. 2 depicts an example of a flowchart 200 to support harmonious tiling layout at runtime. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202 where a plurality of tiles from dynamically aggregated feed of content are accepted. The flowchart 200 starts at block 204 where a plurality of tile templates and harmony configurations received from designer input in form of a web document are accepted and adjusted. The flowchart 200 continues to block 206 where structural layout data is calculated for the plurality of tiles and any of the tiles needs to be processed with one of the tile templates is detected. The flowchart 200 continues to block 208 where the structural layout data is evaluated to ensure that the structural layout is harmonious. The flowchart 200 continues to block 210 where the structural layout data is adjusted and applied to the plurality of tiles to create a harmonious layout of the plurality of tiles. The flowchart 200 ends at block 212 where the harmonious layout of the plurality of tiles are rendered on a user interface for presentation to the user.

Tile

Figure 4:
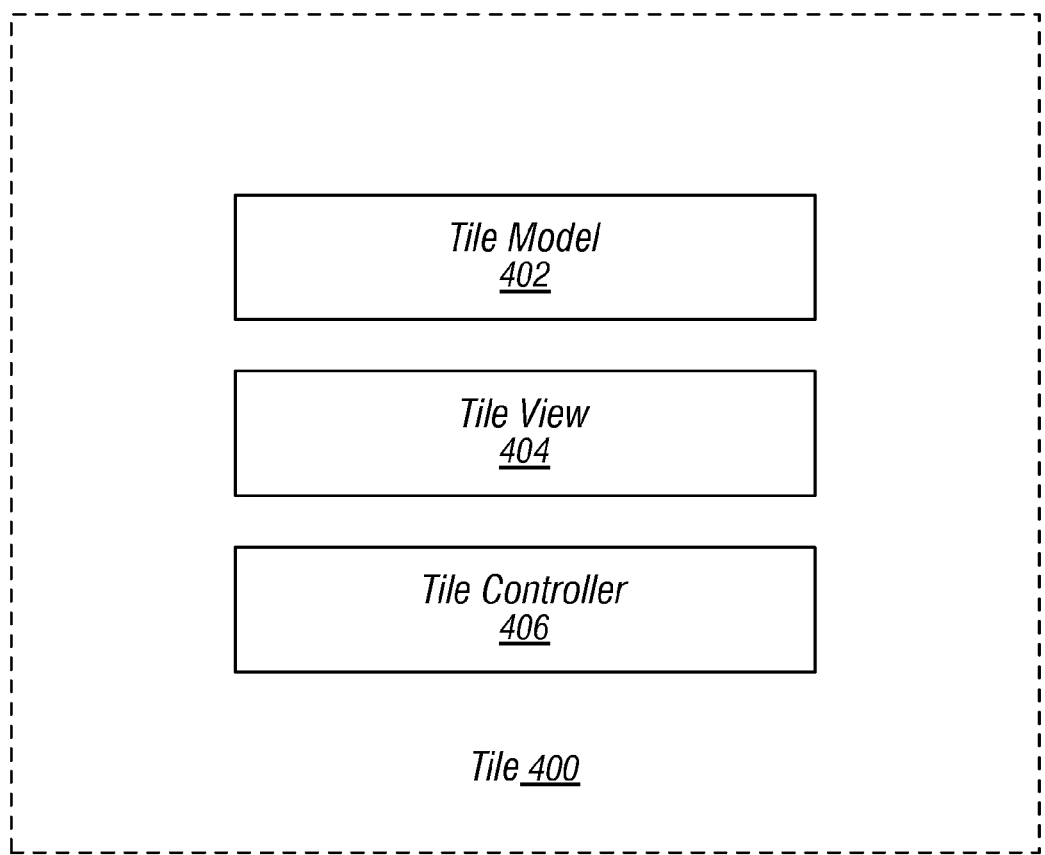
FIG. 4 depicts various components within a tile.

In the example of FIG. 1, Tile Collection 110 is an ordered set of tiles with an API of enumerable functions for such things as sorting, filtering and searching. Tile Collection 110 is used for adding and removing of Tiles. Each tile 400 in Tile Collection 110 is comprised of a Tile Model 402, Tile View 404, and Tile Controller 406 as depicted in FIG. 4 and described in details below. Tile Collection 110 applies the Harmonies Logic to the Tile Models 402, Tile Views 404 then represent the visual form of the Tile Models 402 in their harmonized state for harmonious layout.

In the example of FIG. 4, Tile Model 402 stores state and all the properties for an individual Tile with key-value bindings. It dispatches 'Events' when particular properties of the data change. All other components of the System may listen for these events and do something in response. This allows for highly concurrent, asynchronous events to be triggered while keeping objects from knowing more than it needs to know and Tile Model 402 validates the data.

In the example of FIG. 4, Tile View 404 represents everything sent to the user; the pixels, audio, input, fields, text, video etc. Tile View 404 is the rendered form of a Tile Model 402. Tile Views 404 bind to events from the Tile Models 402 in order to asynchronously represent the state of the data. Each Tile View 404 listens for events, most commonly for user initiated events, and responds by updating a Models State. Tile Views 404 handle the particular implementation of 'rendering' the data from the Tile Model 402. The Tile View 404 is given a 'Template' that it uses for rendering the data.

In the example of FIG. 4, Tile Controller provides a RESTful interface to interact with the rest of the engines of harmonious tiling run-time system 100.

In the example of FIG. 1, a clear API is defined by system 100 for creating and using different types of tiles and to give them a set of rules on how to generate the layout, such as a video tile may restrict its possible aspect ratio, causing the algorithm to adjust its order or find the tiles that best fit the rules to be presented in the same harmony.

In some embodiments, tile layout engine 108 enables an automatically generated harmonious layout to respond to the medium (user interface) in which it is being rendered. Thus, if the layout is rendered in a small mobile browser, it would optimize the harmonies to be viewed on a small screen with touch controls. This would be enabled by providing systems and methods for specifying a 'Responsive' sets of rules for the layout depending on the properties of the browser and device.

In some embodiments, tile layout engine 108 enables the harmonious layout of the tiles to be applied to any arbitrary, well-formed, HTML file. By specifying which DOM elements in the HTML to be included in the layout, tile layout engine 108 can then restructure any website's HTML to be presented in our Harmonious manner.

In some embodiments, tile layout engine 108 further enables replacing CSS based layouts in HTML browsers by enabling web developers to configure a Harmonious Tiling Layout in the metadata of HTML elements without comprising the semantic structure. By combining different types of Harmonies, any structured layout can be implemented, thus the present invention can be used instead of structuring HTML elements with CSS.

In some embodiments, user interaction engine 104 allows users to trade or purchase tile space in order to promote their businesses via user interface 102. Unlike today's website solutions which require manually updating content from other sources, tile layout engine 108 enables users to add an arbitrary number of tiles from other users to the harmonious layout which dynamically display the latest content from another user based on various relevancy signals. These tiles may be optimized similar to the ad and content tile optimization described in the below specification with the addition of using some form of traffic currency for trade (e.g. clicks to open tiles or just tile views). A further example; a popular site generating 100 clicks/day may get 10 times more tile impressions on other sites than a site generating 10 clicks/day.

In some embodiments, tile layout engine 108 allows multiple content contributors to publish tiles to a single website. Today's fixed layout website solutions typically require one person to make prioritization decisions on layout and importance of one block of content over another. In these systems, even if more than one person has layout or prioritization access, the social dynamics of not wanting to make a change without discussing with others prevents more than one person make the change. Tile layout engine 108 eliminates these inefficiencies by dynamically organizing and optimizing the size and placement of the various content tiles based on predetermined rules which the content contributors have agreed upon explicitly by modifying the controls or implicitly by selecting a template with fixed controls.

In some embodiments, the single user interface 102 combines the action of searching and publishing as a single process whereby search results are formatted with the intention to facilitate publishing the chosen items. The present invention makes use of a single interface that allows a user to do perform daily search-tasks from an independent search provider and publish (commented, searched, saved) directly into the web. Without this interface, every search operation is mostly suggested as a single isolated task; in which the search-job ends when the information is found. To save, store or do anything with the selected search result, the user must perform operations such as copying, pasting, bookmarking, and going to other interfaces different from the original interface. The concept of sharing, publishing and commenting on search results promotes the concept of thinking about searches as items that the user will want to publish (comment, share, save). Presenting an interface that will allow a user to easily do that, allows the user to approach searches and the keywords chosen to perform these searches in a different way than a user would do if not thinking of searches with publishing intent. This is why the concept of a single user interface 102 is so important. This idea also supports the following concept: if a search is performed, it is because the information from this operation is relevant to the user, so by allowing the user to easily save, publish and share the chosen search result about one set of "keywords" the searching task has a higher importance than it does if the user can not have easy means of tracking it.

For a non-limiting example, when a user researches for "backend development" and finds a really great link that solved something important, the user has to perform many operations to share and keep that search result. It would a much more economical use of time to perform the search on an interface that will allow the user to publish the search task, referencing the "keyword term used", the "search provider" and the "result chosen" into the user's wall, so the user's audience (followers, colleagues, etc.) can see what information the user is interested in and which results the user found most important. This can be of huge importance for any type of collaborative researcher or team. In addition, this single interface includes the idea of pre-formatting search results according their type, rank, etc. with visual formats (tiles) best suited for quickly and easily publishing/commenting them, including saving relevant information of the search and tracking a history on my actions about this search.

In some embodiments, tile layout engine 108 creates a dashboard displaying media related to a user's interests. The related media may be implicitly determined by extracting concepts or keywords from the user's websites, blogs, social media posts, posts of people followed, posts re-shared, posts liked, etc or explicitly by capturing keywords directly from the user.

In some embodiments, the keywords may be sent to any source of content, and in the exemplary version, search engines which return content for easy publishing. The returned content may be displayed via the harmonious tiling layout serving as a visual prompt to the user to publish to one's harmonious tile based website.

In some embodiments, the keywords may be displayed in multiple tabs which refresh in real-time enabling one to quickly browse and quickly publish media related to one's interests. Unlike a browser where the search results are static, the media related to keywords will be updated in real-time.

In some embodiments, the keywords for the multiple tabs are saved in a user store creating a persistent dashboard of search queries which can be loaded from any machine and any time, unlike a browser where multiple web pages displayed as tabs can disappear once the browser window is closed and are only available from one machine. Furthermore, a new search generates a new persistent search which may be represented as a tab. Any search may be deleted by user action (e.g. clicking an x on the tab).

In some embodiments, user interaction engine 104 further provides global search capabilities in a publishing/sharing platform to enable easy publishing of searched content from the web using a single interface. Unlike other search engine interfaces, users can enter search terms with the intent of publishing and sharing the results. In some embodiments, display of search results can be displayed as harmonious tiles.

In some embodiments, user interaction engine 104 provides a multi-user version of the user interface that enables multiple users to not only share the published content discovered from the saved searches, but also share their search results directly with each other so others can discover and publish content. Search engine interfaces today have no such functionality since they are not viewed as a dashboard where one checks for content related to a topic on a regular basis. Many corporate use cases exist where teams may share a set of saved searches related to their product or function or experts in a particular topic may share their saved searches for others to view to learn more about the expert's topic.

In some embodiments, user interaction engine 104 provides another multi-user version of layout that enables franchise owners to view in their dashboard and publish to their network corporate approved content from the parent franchiser. A similar use case is for content experts in a particular field (e.g. personal accounting) to syndicate content into the dashboard of subscribers who pay the content expert for the feed of content which they can then publish to their network. Both of these use cases are not possible today due to the complexity of getting disparate content management and publishing systems to talk with one another.

In some embodiments, the aforementioned search dashboard enables the following use cases and related value.
- Captures the value of doing a search and find the desired information.
- Captures the value of searching and not finding the desire information. In this case, the persistent search may help one discover content when it becomes available, if not at the time of entering the topic keywords.

The value of doing a search involves the intellectual effort and benefits of filtering data (e.g. display only news topics) associated to a specific term.

It is important to notice that these concepts can not be applied to all keywords possibly used to find information but there are very specific scenarios where it makes a lot of sense. For example, if a user looks for "dogs" that is too broad, but if a user looks for very specific information using "keywords" it works very well. The more specific the group the better the experience of publishing and sharing search results. For another example, occasionally a search is performed and the user will not find exactly what he or she is looking for. If the user can perform a search about a set of keywords and publish in his or her wall that the user did not find what he/she was looking for using "xxxxxx" keywords, then another user may see this and suggest different terms or a page the user can go to. The benefit of this feature is that even if a search is not successful, other users in the network can assist a user, e.g., having the opportunity of not only for the search engine to help one user to find what he/she is looking for but other people in the network can do this too. Thus, there is value in publishing a search experience that was not successful. This actually extends the capabilities of the concept of a search engine as the only method of finding information. Now by sharing this info, a user is bringing social network principles to the concept and use of a search. This concept can be explained in simple words by the way a search is understood. Normally a search is understood as a very smart matching of terms and keywords, but maybe a better definition is "an Internet search is a question to be answered" (a request for information), therefore it is important to capture when it is successful or when it is not. When put in these terms, it makes sense that publishing it will capture the real significance of why a user wants to do that search in the first place.

Harmonies

In one embodiment, tile evaluation engine 106 enables configuration of the harmonious tiling layout that produce 'vertical rhythm' and 'horizontal rhythm', to be input into the system that determine the visual properties of a subset of Tiles. A layout Harmony is input into the system as an Array of Arrays, of the form "[[x1, y1, options1], [x2, y2, options2] ... ]". Each inner array of the form [x, y, options] represents a single tile, where x is the number columns, y is the number of rows, and options is all other variables, for the sake of brevity options will be assumed to be null. x and y can take the form of percents or fractions or other similar mathematical signifiers. The columns and rows are of a base grid unit size and represent integer values of a normalized size. The system is input multiple harmonies in the form of a 3-level nested Array, [[[x1,y1], [x2,y2] . . . ], [[x3,y3], [x4,y4] . . . ] . . . ]

Figure 5A:
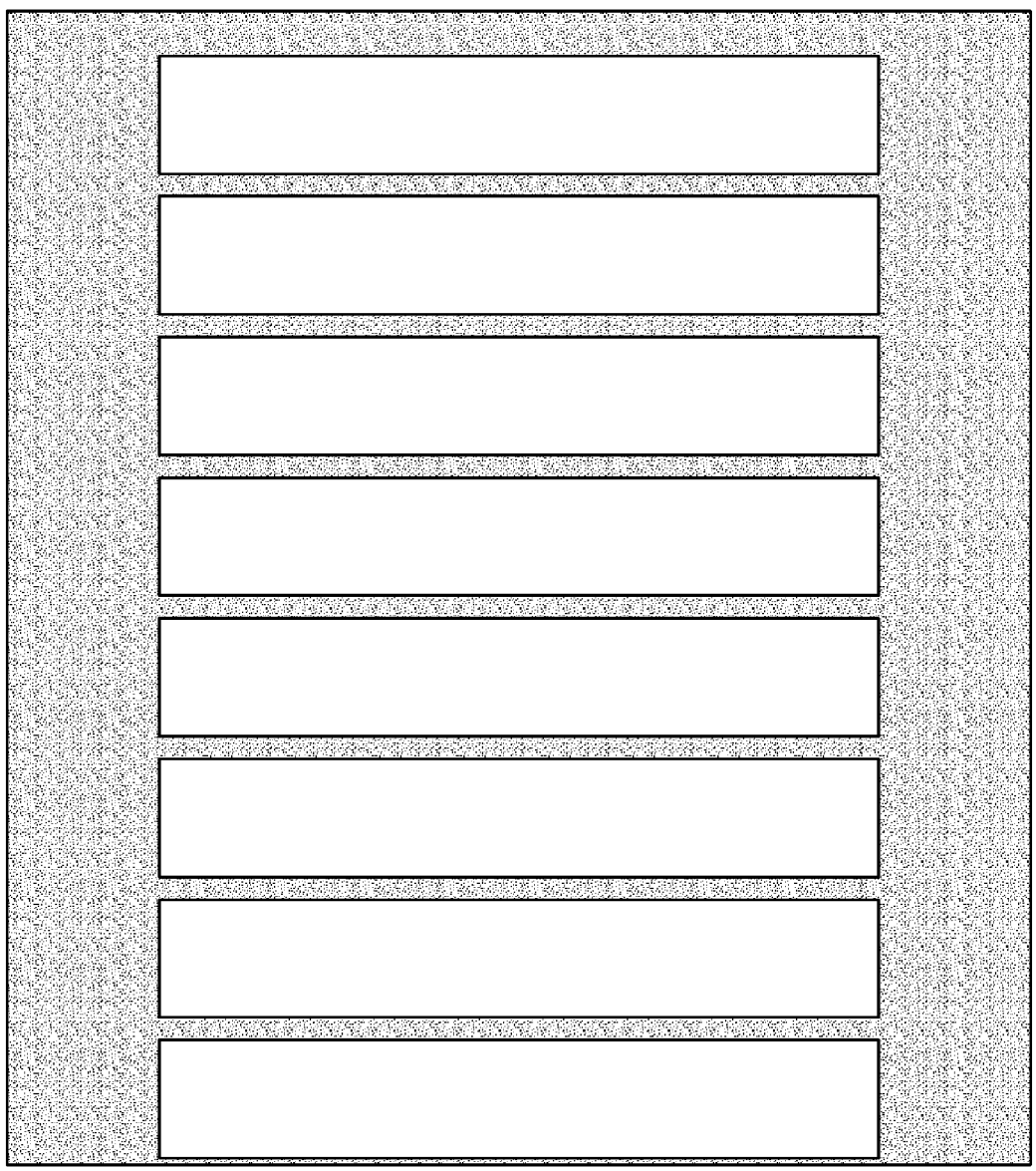
Figure 5B:
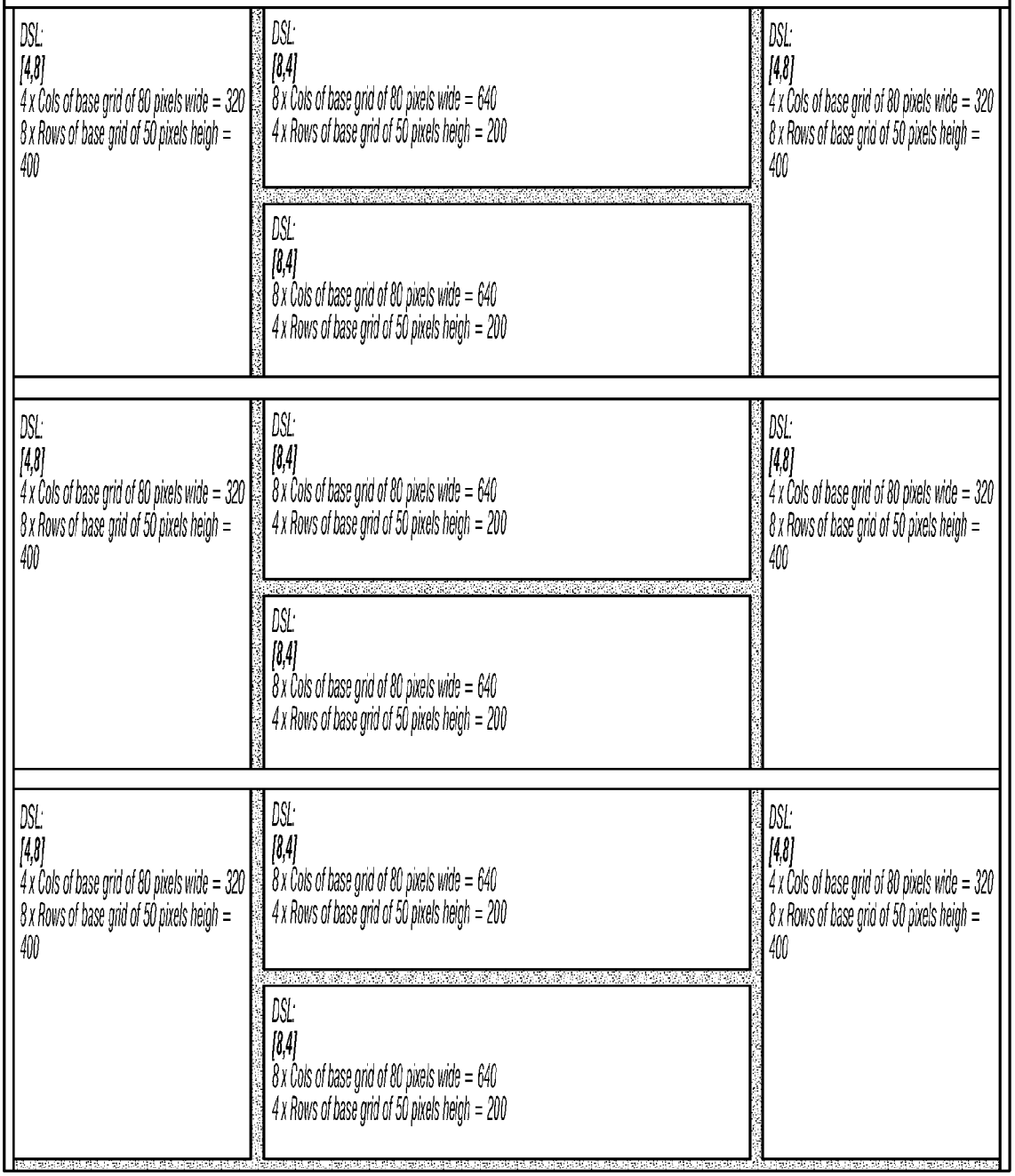
Figure 5C:
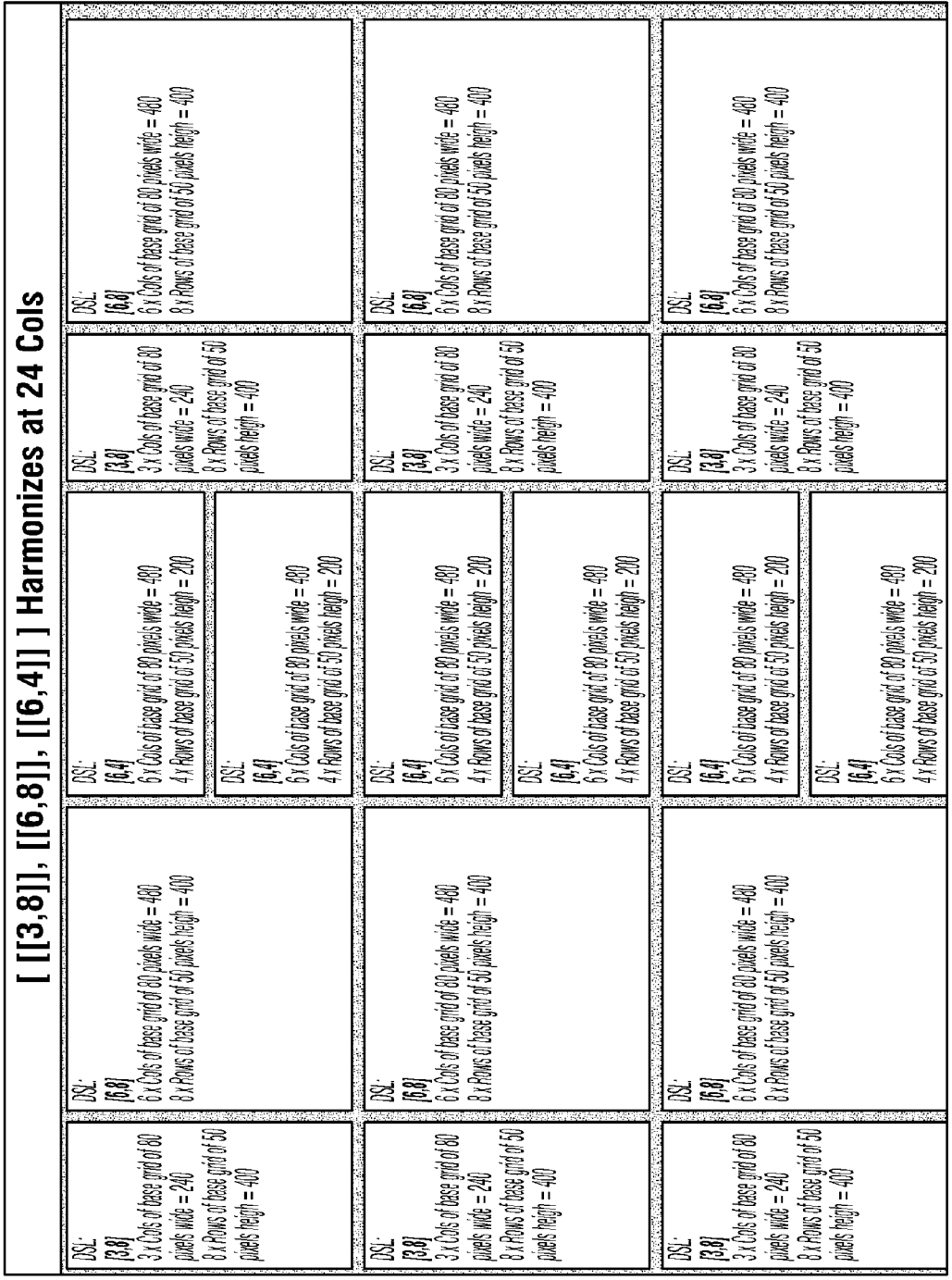

For non-limiting examples, FIG. 5(a) demonstrates how a vertical list layout can be achieved in a container of 10 columns repeating the following harmony: [[[100%, 2]]] which, for the container width of 10 columns, is equivalent to: [[[10, 2]]]. FIG. 5(b) demonstrates a 3 column layout by repeating the following harmony in a container of 16 columns wide: [[[¼,8]], [[½,4]]] which is equivalent to: [[[4,8]], [[8,4]]]. FIG. 5(c) demonstrates a unique 5 column layout in a 24 columns wide container with the following Harmony: [[[3, 8]], [[6,8]], [[6,4]]]. FIG. 5(d) demonstrates a more complex example in a 20 column wide container with the following Harmony:

```
[
    [[4,7],[6,7],[6,7]],
    [[7,6],[6,6],[7,6]],
    [[50%,2],[50%,2],
    [[1/5,10],[12,5],[6,5],[6,5],[1/5,10]],
    [[1,3],[2,3],[3,3],[5,3],[9,3]
]
```

By specifying the base unit size of the integer grid, and choosing an appropriate Layout Logic, any structured layout can be approximated on a pixel display using the Harmony syntax.

Randomness

In some embodiments, tile evaluation engine 106 chooses parameters that will enable random variations of those harmonies to be produced and applied to the tiles. The randomness is applied by randomly shifting the order of the harmonies before being fed through the Layout Logic. Particular Harmonies and Tiles can be fixed in position. Tile evaluation engine 106 can also generate random variations of these harmonies. Tile evaluation engine 106 has parameters for keeping any particular Harmony in any particular order, or randomizing the order of harmonies.

Figure 6A:
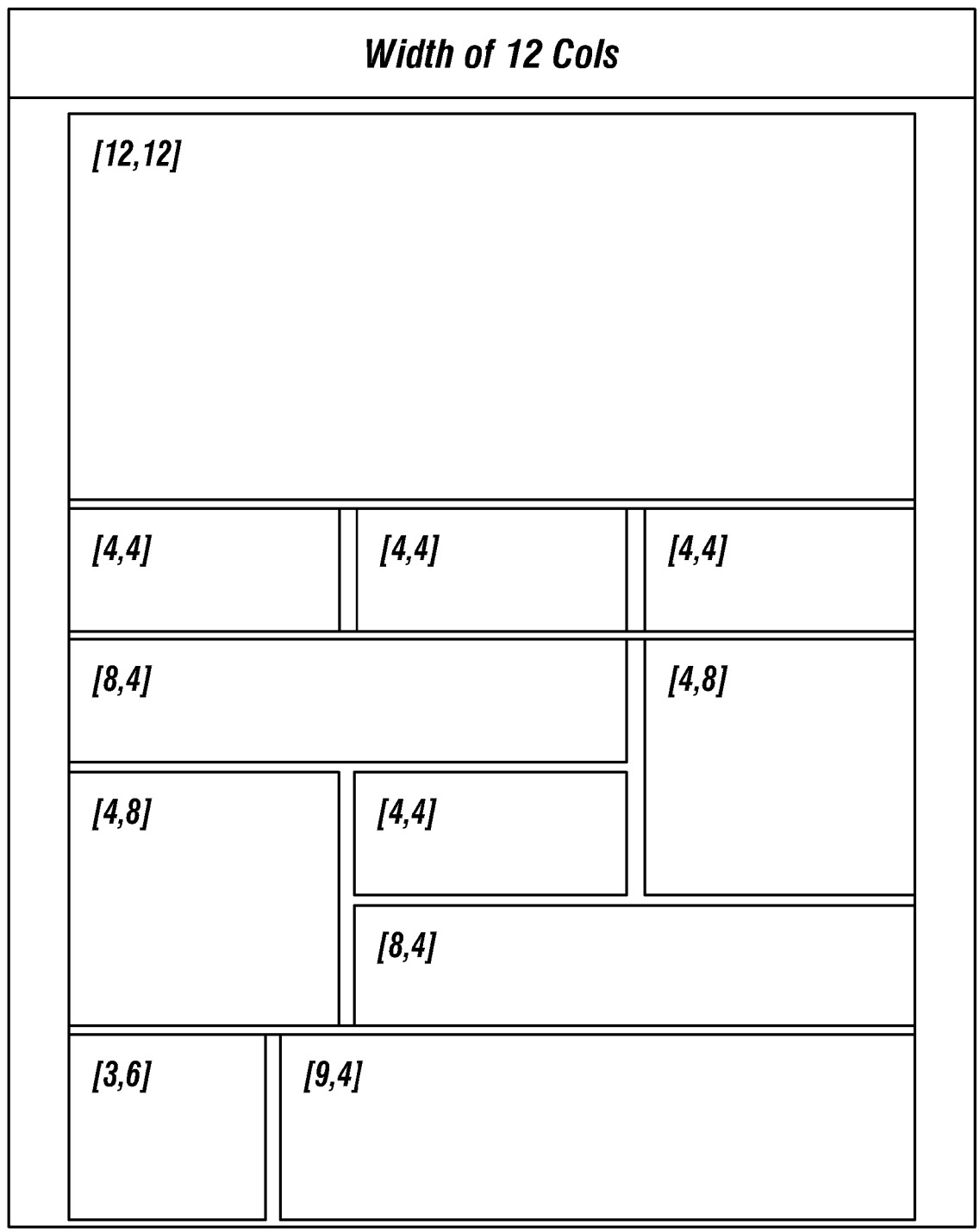
FIGS. 6(a)-(b) depicts examples of harmonious layouts applied to media content.
Figure 6B:
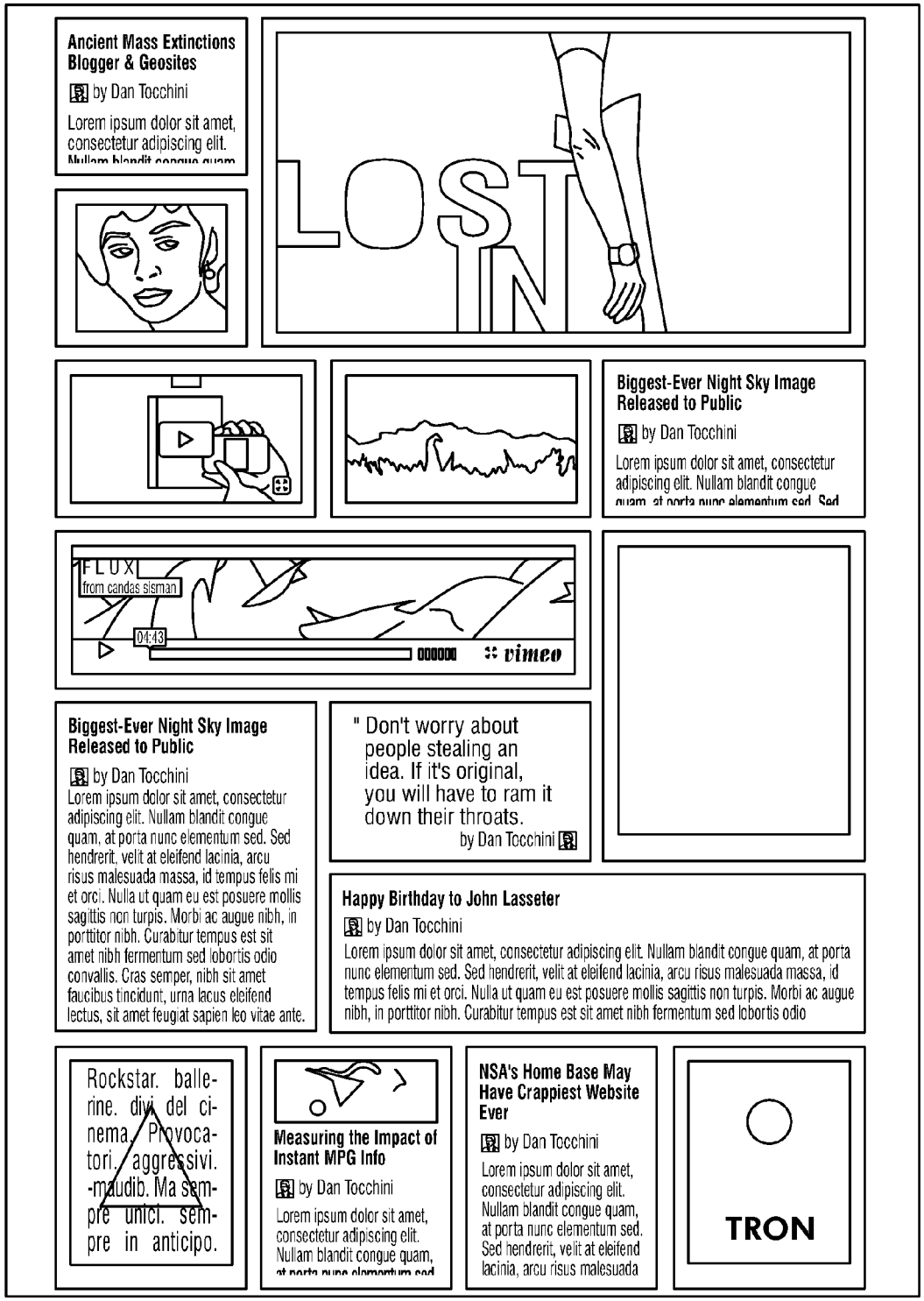

FIG. 6(a) demonstrates the Harmonies of the example below, and FIG. 6(b) shows the same Harmonies applied to media content, both of which have all Harmonies randomized except the first, and the first Harmony is used only once:

```
[
    [[12, 12]],
    [[8, 4], [4, 8], [4, 8], [4, 4], [8, 4]],
    [[4, 4], [4, 4], [4, 4]], [[3, 6], [9, 6]],
    [[6, 4], [6, 4]], [[3, 4], [9, 8], [3, 4]],
    [[3, 6], [3, 6], [3, 6], [3, 6]]
]
```

Layout Logic

In some embodiments, tile layout engine 108 generates the Harmonies geared toward a specific application/implementation of "Layout Logic". The Layout Logic determines how the harmonies are visually constructed. The 'Default Layout Logic' positions 2D polygonal tiles in a 2D polygonal container in a Cartesian coordinate system, and follows the below 2 step layout process:

Positioning Tile in the topmost vertical position within its container, without overlapping another tile.

Positioning Tile to the leftmost horizontal position within its container along its current vertical position, without overlapping another tile.

In some embodiments, tile layout engine 108 may adopt another layout logic implementation may first position the tile horizontally, then vertically. More complex Layout Logic implementations that involve higher dimensions, or alternative coordinate systems, will involve more complex processes, and a different structure for the harmonies. The harmonies discussed here are assumed to be applied to the 'Default Layout Logic'.

Optimized Time Complexity

In some embodiments, the Harmonies determine the relative size and position of the Tiles, while the Layout Logic determines how to construct the layout with straight forward rules. The Harmonies alleviate the Layout Logic from attempting to 'solve' the most optimally packed layout, and just process the Layout Logic with the given properties from the Harmonies. Thus our algorithm is deterministic and runs in linear time, a desired minimum of polynomial time complexity, $O(n)$.

Data Feed & Enumerable Methods

In some embodiments, the system 100 is provided with a single data set of dynamically aggregated feed of content. The core layout algorithm and logics are wrapped with data manipulating functionality at runtime. This enables common, runtime operations on the date set such as searching, sorting, filtering, appending, pre-pending, removing, plucking, comparing, exporting to JSON, exporting XML, reducing, mapping. This enables a perceived multitude of data sets.

In some embodiments, MVC pattern can be used to ease the development of asynchronous UI's that actually use all the features of the system and methods of the present invention by dispatching events and providing methods and an API.

In some embodiments, the system 100 is primarily an "Event-Driven" architecture where the models, or Data Sets, dispatch events that the views, or UIs, respond to. An alternate software architecture could be used with the same purpose.

In some embodiments, the code used to implement system 100 can be in JavaScript, but just as easily applies to any programming language. In one embodiment, the core is tied to rendering HTML/CSS interface elements, but rendering other interfaces, including but not limited to Flask, and the like.

In some embodiments, tile layout engine 108 can detect the most efficient visual layout, based on predetermined usage metrics, and self-optimizes the visual layout. In one embodiment, tile layout engine 108 optimizes the visual layout of a website's content to determine the placement and percentage of ad tiles vs. content tiles. An example of a simple algorithm is to assign values to various content tile consumption actions (e.g. click to view expanded content), and use an estimate of the clicks per view based on past clicks per view to calculate an estimated value for displaying the content tile. For example, a content tile which gets clicked on 20 times for every 100 website views with a value or $0.10 per click would be worth $0.02 per website view (20/100*$0.10). Similarly, an ad which gets clicked on 1 time for every 100 website views with a value of $1.00 per click would be worth $0.01 (1/100*$1.00). The website can mix content with ad tiles and rank them or change their tile size based on value per website view. Per this example, the content tile ($0.02 value) would rank above the ad tile ($0.01 value) and could either be 2× as big or in a tile spot resulting in 2× the standard click through rate.

In some embodiments, the value of a content tile or ad may be the sum of the value of each action on the content tile or ad. For example, a content tile which gets liked 10 times for every 100 website views worth $0.20 per like action and which gets clicked on 20 times for every 100 website views with a value or $0.10 per click would be worth $0.04 per website view (10/100*$0.20+20/100*$10.10).

In some embodiments, the value of content tile actions may be derived from the value a website owner enters for the value of a user visit to their website and estimating the lifetime value of aggregate users who take that action. For example, of users who leave a comment, 20% make a repeat visit to the website every week, while of the users who only view the content, 1% of them make a repeat visit once a month. If the value to the website owner of each visit is $0.01 ($10 per 1,000 visits), then the estimated lifetime value (assume 3 years for simplicity) of users who leave a comment is $0.31 ($0.01*0.2*52*3) and users who only view is $0.0036 ($0.01*0.01*12*3). Other calculations to determine lifetime value may be discounted cash flow or to determine value for a website visit may be selecting your industry or the business model for your website (e.g. ads vs. lead generation, both, etc). Lastly, the website owner may select a sliding scale to bias the system to show less or to show more ads depending on the goals or stage of the business (e.g. a new website owner may choose to show fewer ads in order to get more content consuming actions and resulting repeat visitors).

In some embodiments, revenue generating actions may include, but are not limited to, views of ad tiles, time spent viewing ad tile, clicks on ad tiles, time spent on advertiser website after clicking on a tile, and conversions resulting from interaction with an ad tile or advertiser website. Each of these revenue generating action may also have an associated value assigned to them. Content consuming actions may include; views of content tiles, mouse-over of content tiles, clicks of content tiles, views and time spent viewing expanded content from a tile; mouse-over views, clicks and time spend viewing related content contained in the expanded content from a tile; likes and comments of content tiles or expanded content from a tile either on said website or other websites where tile content may be published. Each of these content consuming attributes may also have an associated value assigned to them. Types of ad tiles may be, but are not limited to; text, image, animated image, video, interactive widgets, audio, etc.

Search

Figure 7A:
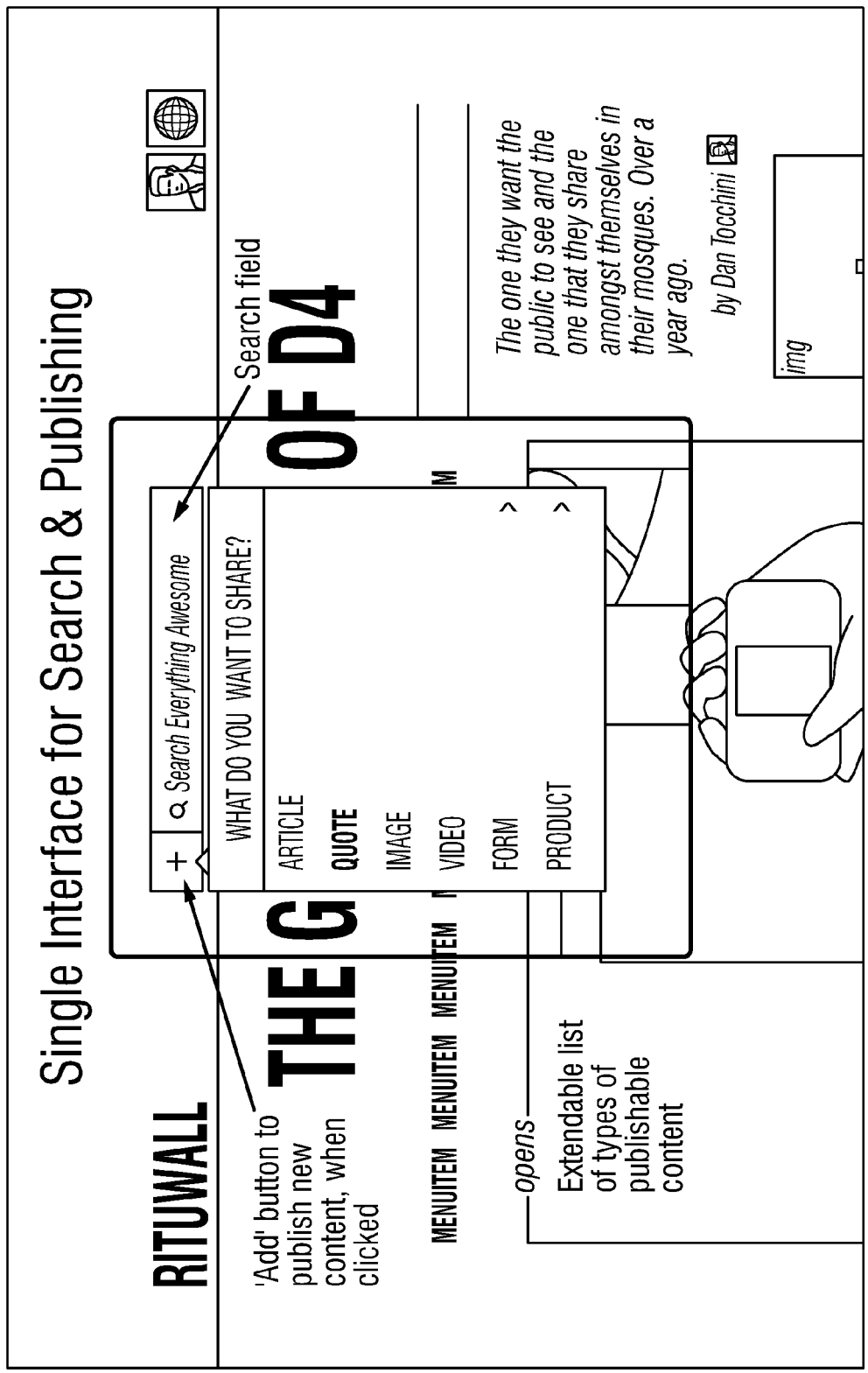
FIGS. 7(a)-(b) depicts examples of results rendered in the harmonious tiling system.
Figure 7B:
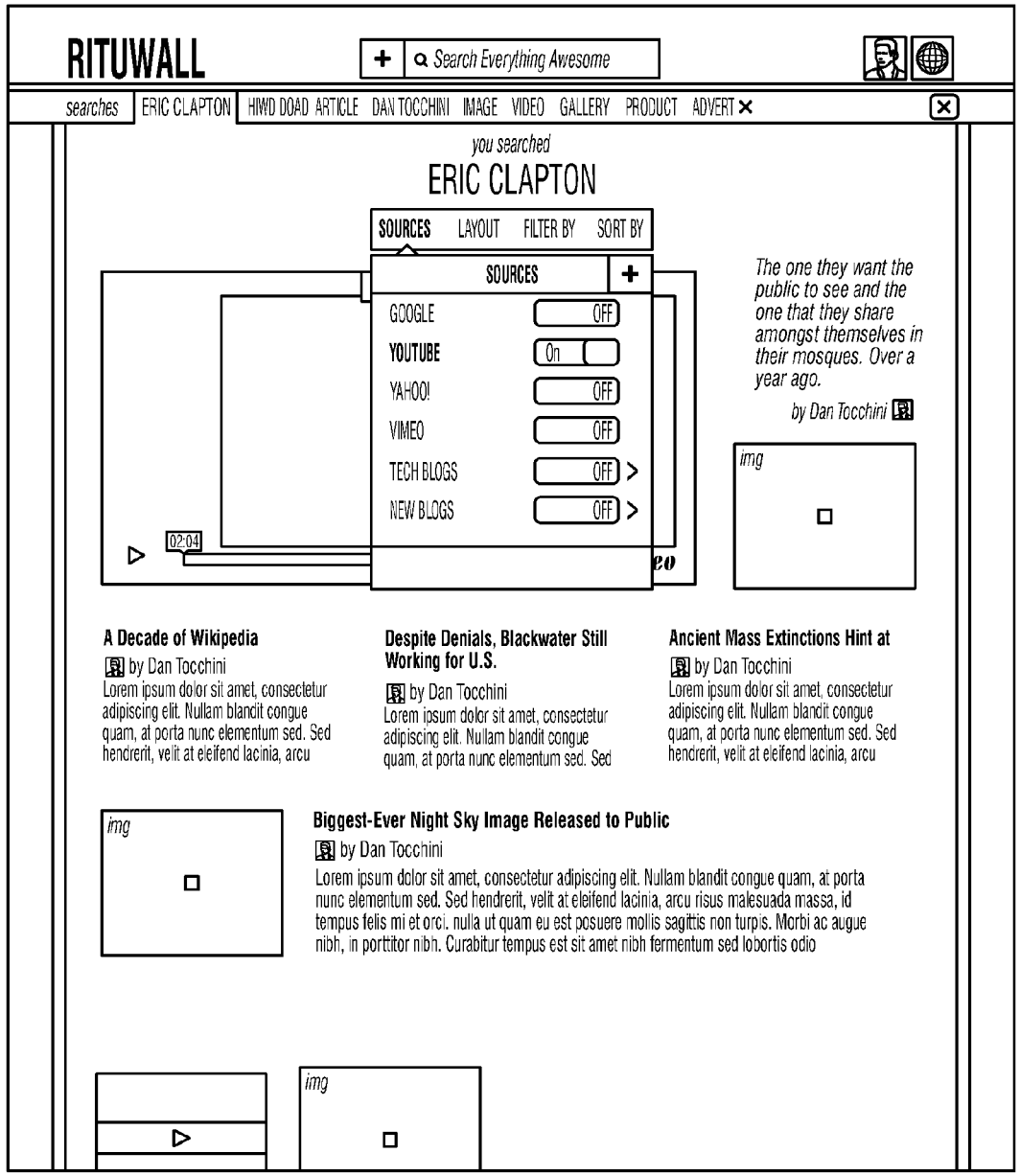

In some embodiments, user Interface 102 is a single user interface that combines the actions of both searching and publishing as one single, integrated process. FIG. 7(*a*) shows an example of a possible implementation of such an interface. FIG. 7(*b*) shows an example of search results rendered in the harmonious tiling system 100 with a configurable set of search sources and tabs for previous searches.

In some embodiments, user Interface 102 presents the search results come from a search provider that crawls and indexes the web (Google/Yahoo/Bing/others) and is independent from the search capabilities provided by the executing interface. The search results are formatted with intention to facilitate publishing of chosen items with the capability of saving, sharing, social networking and commenting selected search results in the web as part of content for publishing tasks.

In the implementation to publish this search results, options may be added to save the keyword term used in the search, the number of search items viewed before the desired published item was selected and additional information about the search experience. Specifically, the implementation to display the search results can be done in different ways to match the look and feel of the enclosing interface. One example is a simple list, in which the results are displayed vertically. There are other formats in which results can be displayed using the "TILE" format. This format described in the other patent can include video, image, formatted text, etc.

In some embodiments, the action of viewing the content in the search results inside of the executing interface can be implemented in an <iframe>, which encapsulates the complete website and can add visual options to save/comment/share the result within the same site.

In some embodiments, with respect to the implementation getting the results from search engine, a user can use standard API calls provided search providers which send a JSON file (JavaScript Object Notation) using AJAX technology to get the data and format it quickly in the results.

In some embodiments, a set of options may be added to the dashboard for saving the search term and store it as web tabs for quickly browsing previous search results. This facilities easy browsing between searches to compare results. In some embodiments, the option to select a search provider from multiples sources can also be added in the interface for easily comparing search results in the dashboard.

In some embodiments, a mechanism may be added to user interface 102 for indicating whether the search is successful or not. This mechanism can be a simple link that saves the results or it can be more sophisticated. A simple rate system can be implemented in which users can rate a search experience and communicate the value found in their operation (positive, negative, very good, acceptable, etc.)

In some embodiments, more than one search results can be selected into this experience so a user can aggregate results into one source of information.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "interface" is used in the embodiments of the systems and methods described above, it will be evident that such concept can be interchangeably used with equivalent software concepts such as, class, method, type, module, component, bean, module, object model, process, thread, and other suitable concepts. While the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

The invention claimed is:

1. A computer-implemented system, comprising:
a tile evaluation engine, which in operation,
accepts a plurality of tiles in a tile collection from dynamically aggregated feed of content;
accepts and adjusts a plurality of tile templates and harmony configurations received from user input wherein said harmony configuration is to produce a hole-free segment of visual real estate on a screen;
evaluating structural layout data to ensure that the structural layout is harmonious;
a tile layout engine, which in operation,
calculates said structural layout data for the plurality of tiles and detecting if any of the tiles needs to be processed with one of the tile templates;
adjusts and applies the structural layout data to the plurality of tiles to create a harmonious layout of the plurality of tiles wherein said harmonious layout is a hole-free segment of visual real estate on a screen;
renders the harmonious layout of the plurality of tiles to the user on a user interface wherein said tile layout engine enables the harmonious layout of the tiles to be applied to any arbitrary, well-formed, HTML file.

2. The system of claim 1, further comprising:
a user interaction engine, which is operation, notifies tile layout engine to fetch more tiles from the tile collection and/or to provide metadata to tile layout engine in the event that display area and/or properties of the user interface have changed and a new layout is needed.

3. The system of claim 2, wherein:
the user interaction engine allows the user to trade or purchase tile space in order to promote its businesses via the user interface.

4. The system of claim 2, wherein:
the user interaction engine further provides global search capabilities in a publishing or sharing platform to enable easy publishing of searched content from the web using a single interface.

5. The system of claim 4, wherein:
the single user interface combines the action of searching and publishing as a single process whereby search results are formatted with the intention to facilitate publishing the chosen items.

6. The system of claim 2, wherein:
the user interaction engine provides a multi-user version of the user interface that enables multiple users to not only share the published content discovered from the saved searches, but also share their search results directly with each other so others can discover and publish content.

7. The system of claim 1, wherein:
each of the plurality of ties comprises a tile model and a tile view, wherein the tile collection applies harmonies logic to the tile model and the tile view then represents visual form of the tile model in its harmonized state for the harmonious layout.

8. The system of claim 1, wherein:
a clear API is defined for creating and using different types of the tiles and to give them a set of rules on how to generate the harmonious layout.

9. The system of claim 1, wherein:
the tile evaluation engine enables configuration of the harmonious tiling that produces 'vertical rhythm' and 'horizontal rhythm' to be input into the system that determine the visual properties of a subset of the tiles.

10. The system of claim 1, wherein:
the tile evaluation engine chooses parameters that will enable random variations of the harmonious layout to be produced and applied to the tiles.

11. The system of claim 1, wherein:
the tile layout engine enables an automatically generated harmonious layout to respond to the medium in which it is being rendered.

12. The system of claim 1, wherein:
the tile layout engine further enables replacing CSS (Cascading Style Sheets) based layout in an HTML browser by enabling configuration of the harmonious layout in metadata of HTML elements of the browser without comprising the semantic structure.

13. The system of claim 1, wherein:
the tile layout engine enables users to add an arbitrary number of tiles from other user to the harmonious layout which dynamically display the latest content from the other user based on various relevancy signals.

14. The system of claim 1, wherein:
the tile layout engine allows multiple content contributors to publish the tiles to a single website.

15. The system of claim 1, wherein:
the tile layout engine creates a dashboard displaying media related to the user's interests.

16. The system of claim 1, wherein:
the tile layout engine generates the harmonious layout geared toward a specific application of a set of layout logic.

17. The system of claim 1, wherein:
the tile layout engine detects the most efficient visual layout based on predetermined usage metrics and self-optimizes the visual layout.

18. The system of claim 17, wherein:
the tile layout engine optimizes the visual layout of a website's content to determine the placement and percentage of ad tiles vs. content tiles.

19. A method, comprising:
accepting a plurality of tiles from dynamically aggregated feed of content;
accepting and adjusting a plurality of tile templates and harmony configurations received from user input wherein said harmony configuration is to produce a hole-free segment of visual real estate on a screen;
calculating structural layout data for the plurality of tiles and detecting if any of the tiles needs to be processed with one of the tile templates;
evaluating the structural layout data to ensure that the structural layout is harmonious;
adjusting and applying the structural layout data to the plurality of tiles to create a harmonious layout of the plurality of tiles wherein said harmonious layout is a hole-free segment of visual real estate on a screen;
rendering the harmonious layout of the plurality of tiles to the user enabling the harmonious tiling layout to be applied to any arbitrary, well-formed, HTML file.

20. The method of claim 19, further comprising:
reducing the amount of time designing interfaces or presenting content is spent in implementing a fixed layout.

21. The method of claim 19, further comprising fitting different size tiles into a fixed or fluid size container efficiently.

22. The method of claim 19, further comprising:
producing variations in layout and the size and presentation of the tiles automatically to produce a harmonious and fresh visual experience, one without gaping holes in the tiled structure of content and where one data feed can be rendered in different ways.

23. The method of claim 19, further comprising:
providing the most optimum layout and tile presentation "win-out" over time, and a survival of the fittest of visual presentation automatically based on configurable metrics.

24. The method of claim 19, further comprising:
removing the hard-work of manually laying information out on a screen put the focus on inputting quality data while trusting that it will be presented in a manner that will maximize configurable goals.

25. The method of claim 19, further comprising:
allowing all types of content, including but not limited to, video, text, audio, images, ads, products, and the like, to be rendered in a magazine like manner with the ability to make itself appear novel by calculated changes in visual presentation.

26. The method of claim 19, further comprising:
defining a clear API for creating and using different types of tiles and to give them a set of rules on how to respond to the layout.

27. The method of claim 19, further comprising:
fixing the relative position and/or order of tiles or particular harmonies.

28. The method of claim 19, further comprising
enabling the automatically generated layout to respond to the medium in which it is being rendered.

29. The method of claim 19, further comprising:
replacing CSS based layouts in HTML browsers by enabling web developers to configure a Harmonious Tiling Layout in the metadata of HTML elements without comprising the semantic structure.

30. The method of claim 19, further comprising:
enabling animated, asynchronous interaction with the harmonies and the tiles.

31. The method of claim 19, further comprising
producing ads, products, promotions and other monetized pieces of content an equal footing in visual real estate as the rest of content, including but not limited to, potentially supplement a data feed with ads and render it such that the it is not apparent what is the ad and the normal content, and to auto-optimize the position of the ad and its visual properties.

32. The method of claim 19, further comprising:
allowing users to trade or purchase tile space in order to promote their businesses.

33. The method of claim 19, further comprising:
providing a rich set of functionality for manipulating the data, without compromising the layout algorithm, such as ordering the tiles by most comments or most social signals, are done on the client in runtime and fed back into the algorithm, or filtering to just show items with a particular tag.

34. The method of claim 19, further comprising:
enabling multiple content contributors to publish tiles to a single website.

35. The method of claim 19, further comprising:
creating and using a single user interface to combine the action of searching and publishing as a single process whereby search results are formatted with the intention to facilitate publishing the chosen items.

36. The method of claim 19, further comprising:
creating a dashboard displaying media related to a user's interests, wherein the related media may be implicitly determined by extracting concepts or keywords from the user's websites, blogs, social media posts, posts of people followed, posts re-shared, posts liked, etc or explicitly by capturing keywords directly from the user.

\* \* \* \* \*